US009704098B2

(12) United States Patent
Waltinger

(10) Patent No.: US 9,704,098 B2
(45) Date of Patent: Jul. 11, 2017

(54) GENERATING A CLASSIFIER FOR PERFORMING A QUERY TO A GIVEN KNOWLEDGE BASE

(71) Applicant: Ulli Waltinger, München (DE)

(72) Inventor: Ulli Waltinger, München (DE)

(73) Assignee: Siemens Aktiengesellschaft, München (DE)

( * ) Notice: Subject to any disclaimer, the term of this patent is extended or adjusted under 35 U.S.C. 154(b) by 288 days.

(21) Appl. No.: 14/334,938

(22) Filed: Jul. 18, 2014

(65) Prior Publication Data
US 2015/0339577 A1    Nov. 26, 2015

(30) Foreign Application Priority Data
May 22, 2014    (EP) .................................... 14169481

(51) Int. Cl.
| *G06F 17/00* | (2006.01) |
| *G06N 5/04* | (2006.01) |
| *G06N 99/00* | (2010.01) |
| *G06F 17/30* | (2006.01) |
| *G06N 5/02* | (2006.01) |

(52) U.S. Cl.
CPC ............... *G06N 5/04* (2013.01); *G06F 17/30* (2013.01); *G06N 5/022* (2013.01); *G06N 99/005* (2013.01)

(58) Field of Classification Search
CPC .................. G06F 17/30; G06F 17/2785; G06F 17/30477; G06F 17/30595; G06N 5/04; G06N 99/005; G06N 99/022

USPC ......................................................... 707/713
See application file for complete search history.

(56) References Cited

U.S. PATENT DOCUMENTS

| 2006/0235823 | A1* | 10/2006 | Chong .............. | G06F 17/30477 707/999.001 |
| 2009/0292716 | A1* | 11/2009 | Oliver ................. | G06F 17/2785 707/999.101 |
| 2011/0225167 | A1* | 9/2011 | Bhattacharjee ... | G06F 17/30595 707/747 |
| 2011/0276588 | A1* | 11/2011 | Moon ............... | G06F 17/30973 707/769 |
| 2013/0346445 | A1* | 12/2013 | Mizell ............... | G06F 17/30908 707/774 |

* cited by examiner

*Primary Examiner* — Kris Mackes
*Assistant Examiner* — Tiffany Bui
(74) *Attorney, Agent, or Firm* — Lempia Summerfield Katz LLC

(57) ABSTRACT

A computer device for generating a classifier for performing a query to a given knowledge base is provided. The given knowledge base includes predicates, subjects and objects related to each other. The computer device includes a selection entity for selecting one of the predicates, and a triple generation entity for generating, based on the given knowledge base, triples. Each of the triples includes the one selected predicate, and a subject and an object related to the one selected predicate. The computer device also includes a candidate generation entity for generating a list of properties. Each property of the list of properties is correlated to the subject and the object of one of the triples by performing a context-based query within the given knowledge base. The computer device includes a classifier generation entity for generating a classifier having the list of properties related to the selected predicate.

15 Claims, 2 Drawing Sheets

FIG 2
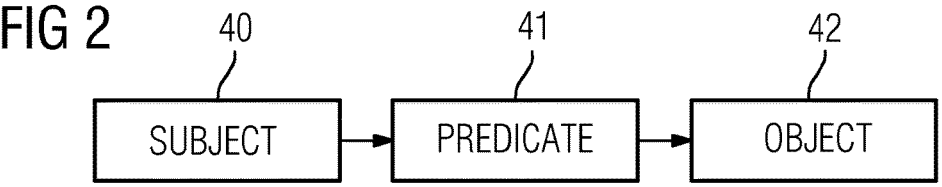
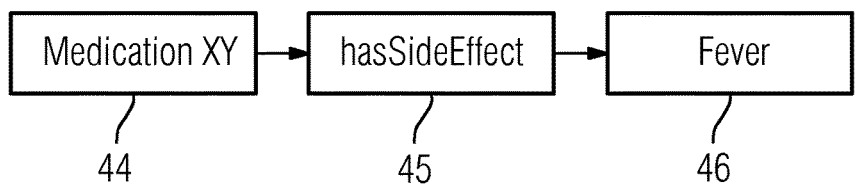
FIG 3
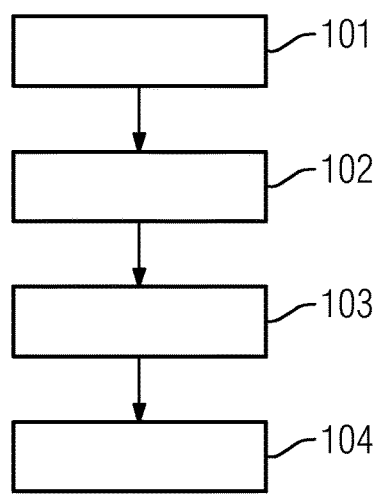

GENERATING A CLASSIFIER FOR PERFORMING A QUERY TO A GIVEN KNOWLEDGE BASE

This application claims the benefit of EP 14169481.0, filed on May 22, 2014, which is hereby incorporated by reference in its entirety.

FIELD

The present embodiments relate to generating a classifier for performing a query to a given knowledge base.

BACKGROUND

The Semantic Web provides a large amount of structured interconnected data. The richness of this data provides new possibilities for research and industry, and opens up new approaches in the human computer interaction. While more and more Resource Description Framework (RDF) data is contributed to the Semantic Web, questions arise on how the user may access this body of knowledge in an intuitive way. In this context, Linked Data driven question answering systems have caught much attention most recently, as these systems allow users, even with a limited familiarity of technical systems and databases, to pose questions in a natural way and gain insights of the data available.

One of the challenges in question answering using RDF-based data is the automatic mapping of natural language questions onto appropriate SPARQL query representation, which subsequently connects a number of interlinked RDF repositories (i.e., translating the individual parts of a natural language question to respective URI representations, as needed for the underlying query language).

For example, when trying to answer the question "What are the side effects of medication XY?" with respect to the Unified Medical Language System data set, the name medication XY is to be mapped to the resource <http://linkedlifedata.com/resource/umls/id/C0220892>, and side effects are to be mapped to the predicate sider:SideEffect.

Most recent work on question answering over linked data that supports an automatic query language construction of questions is focused on using a template-based triple translation, and/or utilizing the Yago or DBpedia ontology for the triplification process.

Most commonly, the task of predicate detection is tackled by using a template-slot-based approach (Unger et al., 2012). The input representation is matched against a given formal query template representation and subsequently populated with the appropriate slot values. The matching builds upon a rule-based decision tree that uses a fuzzy match algorithm. More precisely, these systems utilize a predefined set of synonym terms that are related to a specific predicate or entire query template.

For example, within the Linked Life Data repository for the question "What drugs cause vomit?", the relation term 'cause' would be mapped onto the predicate
rdf:type sider:SideEffect
so that a query template would be represented as:

```
SELECT distinct ?d ?n
WHERE {
    ?o umls: <SLOT-VALUE>.
    ?d <PREDICATE-VALUE> ?o.
    ?d sider-drugs:drugName ?n.
}
``` with the predicate value sider:SideEffect for cause and the slot value umlsconcept: C0042963 for vomit.

SUMMARY AND DESCRIPTION

The scope of the present invention is defined solely by the appended claims and is not affected to any degree by the statements within this summary.

The present embodiments may obviate one or more of the drawbacks or limitations in the related art. For example, matching of natural language questions to predefined predicates is improved.

According to a first aspect, a computer device for generating a classifier for performing a query to a given knowledge base is provided. The given knowledge base includes a plurality of predicates, a plurality of subjects and a plurality objects related to each other. The computer device includes a selection entity for selecting one predicate from the plurality of predicates, and a triple generation entity for generating, based on the given knowledge base, a plurality of triples. Each triple includes the one selected predicate and a subject and an object related to the one selected predicate. The computer device also includes a candidate generation entity for generating a list of properties by performing a context-based query within the given knowledge base. Each property of the list of properties is correlated to the subject and the object of one triple of the plurality of triples. The computer device also includes a classifier generation entity for generating a classifier having the list of properties related to the selected predicate.

Using the provided computer device, natural language queries may be converted into queries that correspond to standard queries (e.g., include predefined predicates). Thus, natural language queries may also be answered using a given knowledge base having predefined predicates, subjects and objects. The computer device may be used in the health care sector when accessing medical databases.

The respective entity (e.g., the triple generation entity) may be implemented in hardware and/or in software. If the entity is implemented in hardware, the entity may be embodied as a device (e.g., as a computer or as a processor or as a part of a system such as a computer system). If the entity is implemented in software, the entity may be embodied as a computer program product, as a function, as a routine, as a program code or as an executable object.

Different to the conventional systematic, the herein described computer device may establish a mechanism that focuses on relational learning within the context of a given knowledge base (e.g., RDF-based Linked Data). In other words, instead of utilizing templates and dictionaries for the predicate matching, the different surface forms and corresponding relations may be learned using machine learning techniques automatically.

In this context, the interpretation of natural language questions refers to the process of an automatic triplification (e.g., generation of triples) for SPARQL query language construction, and corresponding challenges of an automatic concept identification and URI-based (e.g., subject, predicate, object) disambiguation.

In order to process natural language queries, the identification and disambiguation of relationship types (e.g., a reference that connects different URIs like subjects and objects) is an important aspect. Such a reference may be referred to as predicate or property.

While there exist various conventional components and tools that allow mapping textual fragments onto a corresponding URI representation (e.g., in terms of subject or object), many components and tools are not able to map the relations onto the ontology representation of a given knowledge base (e.g., in terms of an RDF-based predicate/property representation).

According to the described computer device, learning and detecting of RDF-based predicate relations within unstructured data may be provided. The computer device may establish a learning mechanism that utilizes Linked Data information to train a generic classifier that is able to detect and extract RDF-based relation types within natural language questions or text. The computer device may aim to support thereby the task of an automatic triplification using SPARQL-based query construction.

The given knowledge base includes a plurality of subjects, a plurality of objects, and a plurality of predicates. The plurality of subjects and the plurality of objects are connected by the plurality of predicates, which defines relations between a subject and an object. The selection entity selects one of the predicates. The triple generation entity searches for subjects and objects connected via the selected predicate within the given knowledge base and generates triples including one of the subjects, one of the objects and the selected predicate.

The candidate generation entity searches the given knowledge base by a context-based query in order to find different properties (e.g., relations that connect subjects and objects) that correlate the subject and object of one triple. The classifier generation entity generates a classifier that includes the different properties as a list of properties referring to the selected predicate.

According to an embodiment, the triple generation entity is configured to select a plurality of subjects and objects each having the selected predicate.

This provides that a plurality of subjects and objects are connected via the selected predicate. These subjects and objects are selected to be used as triples.

According to a further embodiment, the triples of the plurality of triples are RDF-based triples. The subjects and objects of the plurality of triples are URI-based subjects and URI-based objects.

The subjects and objects are URI-based subjects and objects connected by a predicate. One triple includes a subject, an object and one predicate connecting the subject and the object. The triples may be RDF-based triples.

According to a further embodiment, the candidate generation entity is configured to process a reference text of the given knowledge base to find at least one sentence with an occurrence of the subject and the object of one triple of the plurality of triples.

To perform a context-based query, sentences of the given knowledge base are searched in order to find one or more sentences that have the subject and the object of one triple. For this purpose, a text of the given knowledge base selected as reference text may be used. Sentences in this context may be reference sentences that also include half sentences, subsets or clauses.

According to a further embodiment, the candidate generation entity is configured, when processing the reference text, to generate a search query. The search query requests sentences, in which the subject and the object of one triple of the plurality of triples occur.

To generate the search query, phrases defined in the given knowledge base to create queries may be used.

According to a further embodiment, the candidate generation entity is configured to process the reference text for each triple of the plurality of triples.

The candidate generation entity may process the reference text separately for each triple or may process the reference text for all triples at once. For example, the candidate generation entity may generate a list of properties found in the reference text as relations between the subjects and the objects of the triples.

According to a further embodiment, the candidate generation entity is configured to convert the subjects and the objects occurring in the requested sentences into generic subjects and generic objects.

This provides that, in order to generate the list of properties, the subjects, objects and properties as found are converted into triples having a generic subject, a generic object and a found property. The found property is not in generic form. Generic in this context provides that a specific subject (e.g., a name of an author) is referenced only as subject. The same applies to a specific object (e.g., a name of a book) that is referenced only as object in the generic form. However, the different properties (e.g., wrote, is author of, etc.) may remain.

According to a further embodiment, the selection entity is configured to select a number of predicates from the plurality of predicates. The triple generation entity is configured to generate a number of triples for each predicate of the number of predicates. The candidate generation unit is configured to generate a list of properties for each of the number of triples. The classifier generation entity is configured to generate a classifier model including a plurality of classifiers having the list of properties related to each of the number of selected predicates.

According to this embodiment, the process of generating a list of properties is repeated for each predicate of the given knowledge base. As a result, the classifier model includes a plurality of properties for each predefined predicate of the given knowledge base.

According to a further embodiment, the computer device further includes a detection entity for receiving a natural language query and for processing the natural language query using the generated classifier.

Based on the generated classifier, a natural language query may be processed. This provides that the natural language query is searched in order to find a subject, an object and any kind of property connecting the subject and the object. The classifier or the classifier model is searched to find the property and the predicate that is related to the property. The natural language query may then be answered, as the given knowledge base may be searched using the corresponding predicate.

According to a further embodiment, the candidate generation entity is configured to generate the classifier based on a matrix, in which each of the requested sentences is represented as a feature vector.

The matrix includes the requested sentences in a matrix representation. In this matrix representation, the objects and subjects of the sentences may be anonymized (e.g., in a generic form). All sentences are decomposed into terms and phrases and stored as feature vectors in the matrix. One feature vector of the matrix includes rows (e.g., the sentences) and columns (e.g., the single features such as terms, Part of Speech tags, linguistic information, etc.). The matrix may be used to train the classifier, which has an individual representation based on the matrix. The classifier may be a kind of pointer pointing to the predicate (e.g., having the predicate as target value).

According to a further embodiment, the detection entity is configured to process the natural language query using the generated classifier by converting the natural language query into a feature vector using the generated matrix.

Thus, the natural language query may be easily answered using the feature vector referring to a predicate of the given knowledge base.

According to a further embodiment, the classifier generation entity includes a training entity for generating the classifier model by using a support vector machine.

A support vector machine (SVM) is a supervised learning model with associated learning algorithms that analyze data and recognize patterns, used for classification and regression analysis. Given the feature vector representation as described above, a learning procedure may be applied. More precisely, the training entity may use a machine learning-based RBF-kernel method, a linear kernel, or any other multi-class classifier using Support Vector Machines. The SVM as a multi-class classifier may thereby utilize the entire list of properties with their associated candidate feature vector representations to predicate the best hyper plane that separates or maximizes the margin between the different target values. As a result, a single classifier model that is used for the predicate identification task when performing queries may be constructed.

According to a further embodiment, the training entity is configured to use the support vector machine with the generated matrix.

As examples for the SVM, the generated matrix may be used. Thus, the feature vectors may be used to generate further entries into the matrix.

Any embodiment of the first aspect may be combined with any embodiment of the first aspect to obtain another embodiment of the first aspect.

According to a second aspect, a method for generating a classifier for performing a query to a given knowledge base is provided. The given knowledge base includes a plurality of predicates, a plurality of subjects and a plurality objects being related to each other. The method includes selecting one predicate from the plurality of predicates, and generating, based on the given knowledge base, a plurality of triples. Each triple of the plurality of triples includes the selected predicate, and a subject and an object related to the selected predicate. The method also includes generating a list of properties by performing a context-based query within the given knowledge base. Each property of the list of properties is correlated to the subject and the object of one triple of the plurality of triples. The method includes generating a classifier having the list of properties related to the selected predicate.

According to an embodiment, the method further includes receiving a natural language query and processing the natural language query using the generated classifier.

Thus, a natural language query (e.g., a question) may be converted into a query that may be processed by the given knowledge base.

According to a further aspect, a computer program product including a program code for executing the above-described method by a processor for generating a classifier for performing a query to a given knowledge base when run on at least one computer is provided.

A computer program product, such as a computer program device, may be embodied as a memory card, a USB stick, a CD-ROM, a DVD or as a file that may be downloaded from a server in a network. For example, such a file may be provided by transferring the file including the computer program product from a wireless communication network.

The embodiments and features described with reference to the device apply also to the method.

Further possible implementations or alternative solutions also encompass combinations not explicitly mentioned herein of features described above or below with regard to the embodiments. The person skilled in the art may also add individual or isolated aspects and features to the most basic form of the present embodiments.

Further embodiments, features and advantages of the present embodiments will become apparent from the subsequent description in conjunction with the accompanying drawings.

BRIEF DESCRIPTION OF THE DRAWINGS

FIG. 2 shows an embodiment of an RDF triple; and

FIG. 3 shows an embodiment of a sequence of method acts for generating a classifier for performing a query to a given knowledge base.

In the Figures, like reference numerals designate like or functionally equivalent elements, unless otherwise indicated.

DETAILED DESCRIPTION

Figure 1:
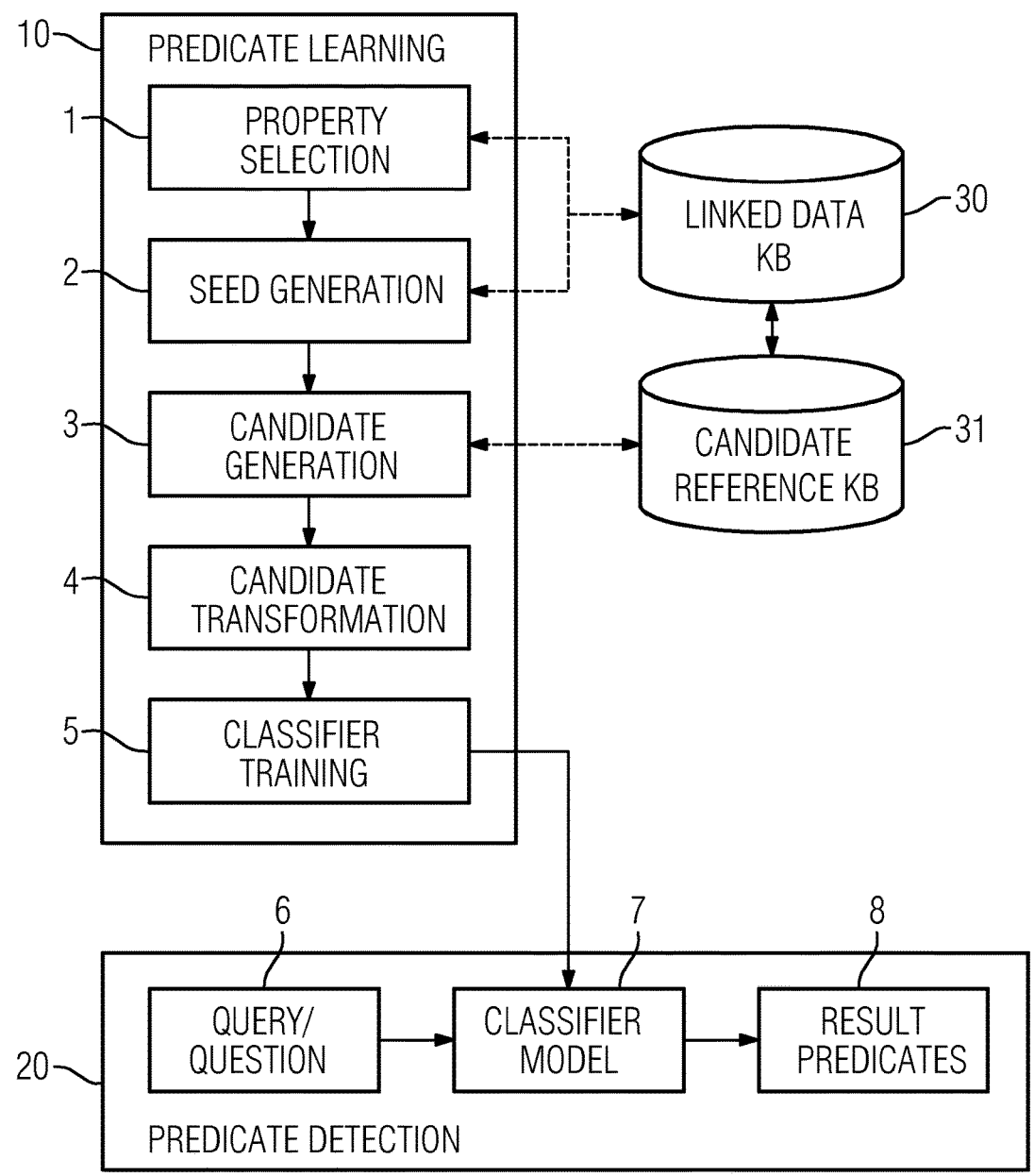
FIG. 1 shows an embodiment of a computer device for generating a classifier for performing a query to a given knowledge base.

FIG. 1 shows a schematic block diagram of a first embodiment of a computer device for generating a classifier or a classifier model 7 for performing a query to a given knowledge base 30.

The computer device carries out two different phases. First, a learning phase that is carried out in a learning unit 10 allows a list of RDF-based predicate types to be defined. In this learning unit 10, individual predicate instances of a given knowledge base 30 are utilized as a stimulus for building a list of SPARQL queries (e.g., carried out in a selection entity 1), which allows generating a list of candidate seeds (e.g., carried out in a triple generation entity 2). The seeds are further processed (e.g., in a candidate generation entity 3 and a candidate transformation entity 4) to generate a list of candidate representations that are used (e.g., by a classifier training entity 5) as a training corpus for building the relationship classifier or classifier model 7. The classifier model 7 includes a plurality of classifiers.

Within the machine learning domain, the most challenging aspect is the acquisition of labeled data/training corpus. The construction of this reference collection may involve a manual annotation. The computer device described herein allows using the same Linked Data resource 30, for which the predicates/properties are learned from, as a reference plane for corpus construction and classifier training. In other words, the computer device is not bound to a specific RDF-repository, but may be applied to any Linked Data Cloud instance.

The second phase, which is carried out in a detection unit 20 of the computer device, focuses on the predicate detection and extraction. The detection unit 20 converts a given natural question or text fragment 6 into a fixed feature space, and applies the machine learning classifier model 7 to identify the predicate relation 8 within the text and/or between two URI representations.

The learning unit 10 (e.g., the RDF-based predicate learning phase) may be subdivided into five consecutive processing entities.

In the selection entity 1, a number of properties or predicates are selected from a given RDF-based knowledge base 30. For example:
dbpprop:author In the triple generation entity 2, a formal SPARQL request to the given knowledge base 30 is performed to get a set of objects and subjects bound to the requested predicate. Found entities are presented in the form of triples as ?o (object) ?p (predicate) ?s (subject), where ?p is the same for all, as, for example:
"Author XY" dbpprop:author "Book Z"
"Author XY" dbpprop:author "Book W"

In other words, the triple generation entity 2 selects a list of URI-based objects and subjects (e.g., "Author XY", "Author AB"), all which have the predicate (e.g., dbpprop:author) in common. The resulting representation is a list of RDF-based triples that are connected by the same relationship predicate. This process may be referred to as seed generation. The resulting list may be referred to as RDF seeds.

In the candidate generation entity 3, based on the generated RDF seeds, a reference text corpus 31 (e.g., part of the given knowledge base 30) is processed to find one or more sentences with occurrences of both object (?o) and subject (?s). In other words, the computer device utilizes the RDF-based seed list to construct a search query based on the reference collection. The search query requests documents (e.g., individual sentences), in which the object (e.g., "Author XY") and the subject (e.g., "Book Z") occur.

As a result, the candidate generation entity 3 constructs a list of candidate instances, such as:
Author XY wrote Book Z.
Author XY is author of Book W In the candidate transformation entity 4, which may be integrated in the candidate generation entity 3 having the list of candidate instances generated, a transformation of the sentence representation is performed. In other words, in order to allow the classifier to train the generic representation of a predicate, all occurrences of subjects and objects are converted into an abstract representation, such as:
(?s) wrote a (?o).
(?s) is author of (?o)

More precisely, the computer device introduces a context window, defined as the list of terms before, after, and between both URIs (as subject and object). The list of allowed term features are subsequently further processed by a NLP component, which may include stemming, lemmatization, Part-of-Speech-Tagging, Named Entity Recognition, and Dependency Parsing. All NLP-related features may be used to construct a feature matrix, where each candidate instance is represented as a feature vector having the predicate instance as the target value.

In the training entity 5, given the feature representation of the candidate transformation, the learning procedure is applied. More precisely, the training may build upon the machine learning-based RBF-kernel method using Support Vector Machines (SVM). This multi-class classifier thereby utilizes the entire list of predicates with associated candidate feature vector representations to predicate the best hyper plane that separates or maximizes the margin between the different target values. As a result, a single classifier model 7 is constructed. The classifier model 7 is used for the property identification task.

In the detection unit 20 (e.g., the predicate detection), the computer device utilizes the multi-class classifier 7 to identify the predicate relation within a text and/or between two URI representations. For example:
Who (wrote) Book XY.→dbpprop:author
Who (is the author of) Book W→dbpprop:author The predicate identification phase 20 is split into two consecutive acts. First, the feature vector construction. This process represents any given natural language document or question 6 as a feature vector by utilizing the same term feature list (e.g., the classifier model 7), as produced by the classifier training act 5.

Second, the computer device applies the pre-learned classifier 7 to detect the best-matching predicate instance 8 by using the constructed feature vector as an input. Matched term features are subsequently highlighted as the target surface form, which instantiates the predicate relationship. In other words, the algorithm allows identification of formal property/predicate relations with reference to a given knowledge repository.

FIG. 2 shows a schematic block diagram of an embodiment of an RDF triple.

As shown in a generic form, the triple includes subject 40, predicate/property 41 and object 42. All parts of the triple may occur in one sentence 43. When the sentence 43 is divided into subject 40, predicate 41 and object 42, medication XY 44 represents the subject 40, hasSideEffect 45 represents the predicate 41, and fever 46 represents the object 42.

FIG. 3 shows one embodiment of a method for generating a classifier or a plurality of classifiers as classifier model 7 for performing a query 6 to a given knowledge base 30. The given knowledge base 30 includes a plurality of predicates 41, a plurality of subjects 400 and a plurality objects 42 related to each other.

In act 101, one predicate 41 from the plurality of predicates 41 is selected.

In act 102, a plurality of triples is generated. Each triple of the plurality of triples includes the one selected predicate 41, and a subject 40 and an object 42 related to the one selected predicate 41, In act 103, a list of properties 41 is generated by performing a context-based query within the given knowledge base 30. Each property of the list of properties is correlated to the subject 40 and the object 42 of one triple of the plurality of triples, In act 104, a classifier 7 having the list of properties related to the selected predicate 41 is generated.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer device for generating a classifier for performing a query to a given knowledge base, the given knowledge base including a plurality of predicates, a plurality of subjects and a plurality objects related to each other, the computer device comprising:
a processor configured to:
select one predicate from the plurality of predicates;
generate, based on the given knowledge base, a plurality of triples, each triple of the plurality of triples including the one selected predicate, and a subject of the plurality of subjects and an object of the plurality of objects related to the one selected predicate;
generate a list of properties, each property of the list of properties being correlated to the subject and the object of the triple of the plurality of triples, the generation of the list of properties comprising performance of a context-based query within the given knowledge base;
generate a classifier having the list of properties related to the one selected predicate; and
transform a question or a portion of a document based on the generated classifier such that the question or the portion of the document includes a predefined predicate.

2. The computer device of claim 1, wherein the processor is further configured to select subjects of the plurality of subjects and objects of the plurality of objects each having the one selected predicate.

3. The computer device of claim 1, wherein the plurality of triples are RDF-based triples, and
wherein the subjects and objects of the plurality of triples are URI-based subjects and URI-based objects, respectively.

4. The computer device of claim 1, wherein the processor is further configured to process a reference text of the given knowledge base to find at least one sentence with an occurrence of the subject and the object of one triple of the plurality of triples.

5. The computer device of claim 4, wherein the processor is further configured, when processing the reference text, to generate a search query, the search query requesting sentences, in which the subject and the object of the one triple of the plurality of triples occur.

6. The computer device of claim 4, wherein the processor is further configured to process the reference text for each triple of the plurality of triples.

7. The computer device of claim 4, wherein the processor is further configured to convert subjects and objects occurring in requested sentences into generic subjects and generic objects.

8. The computer device of claim 7, wherein the processor is further configured to generate the classifier based on a matrix, in which each of the requested sentences is represented as a feature vector.

9. The computer device of claim 1, wherein the processor is further configured to:
select a number of predicates from the plurality of predicates;
generate a number of triples for each predicate of the number of predicates;
generate a list of properties for each of the number of triples; and
generate a classifier model including a plurality of classifiers having the list of properties related to each of the number of selected predicates.

10. The computer device of claim 9, wherein the processor is further configured to generate the classifier model, the generation of the classifier model comprising use of a support vector machine.

11. The computer device of claim 10, wherein the processor is further configured to use the support vector machine with the generated matrix.

12. The computer device of claim 1, wherein the processor is further configured to receive a natural language query and to process the natural language query using the generated classifier.

13. The computer device of claim 12, wherein the processor is further configured to process the natural language query using the generated classifier by converting the natural language query into a feature vector using the generated matrix.

14. A method for generating a classifier for performing a query to a given knowledge base, the given knowledge base including a plurality of predicates, a plurality of subjects and a plurality objects being related to each other, the method comprising:
selecting one predicate from the plurality of predicates;
generating, based on the given knowledge base, a plurality of triples, each triple of the plurality of triples including the one selected predicate and a subject of the plurality of subjects and an object of the plurality of objects related to the one selected predicate;
generating a list of properties, the generating of the list of properties comprising performing a context-based query within the given knowledge base, each property of the list of properties being correlated to the subject and the object of one triple of the plurality of triples;
generating a classifier having the list of properties related to the one selected predicate; and
transforming a question or a portion of a document based on the generated classifier such that the question or the portion of the document includes a predefined predicate.

15. The method of claim 14, further comprising receiving a natural query and processing the natural language query using the generated classifier.

* * * * *